(No Model.)
G. W. MILLER.
DIE FOR SHAPING CAR WHEEL RIMS.
No. 373,084. Patented Nov. 15, 1887.
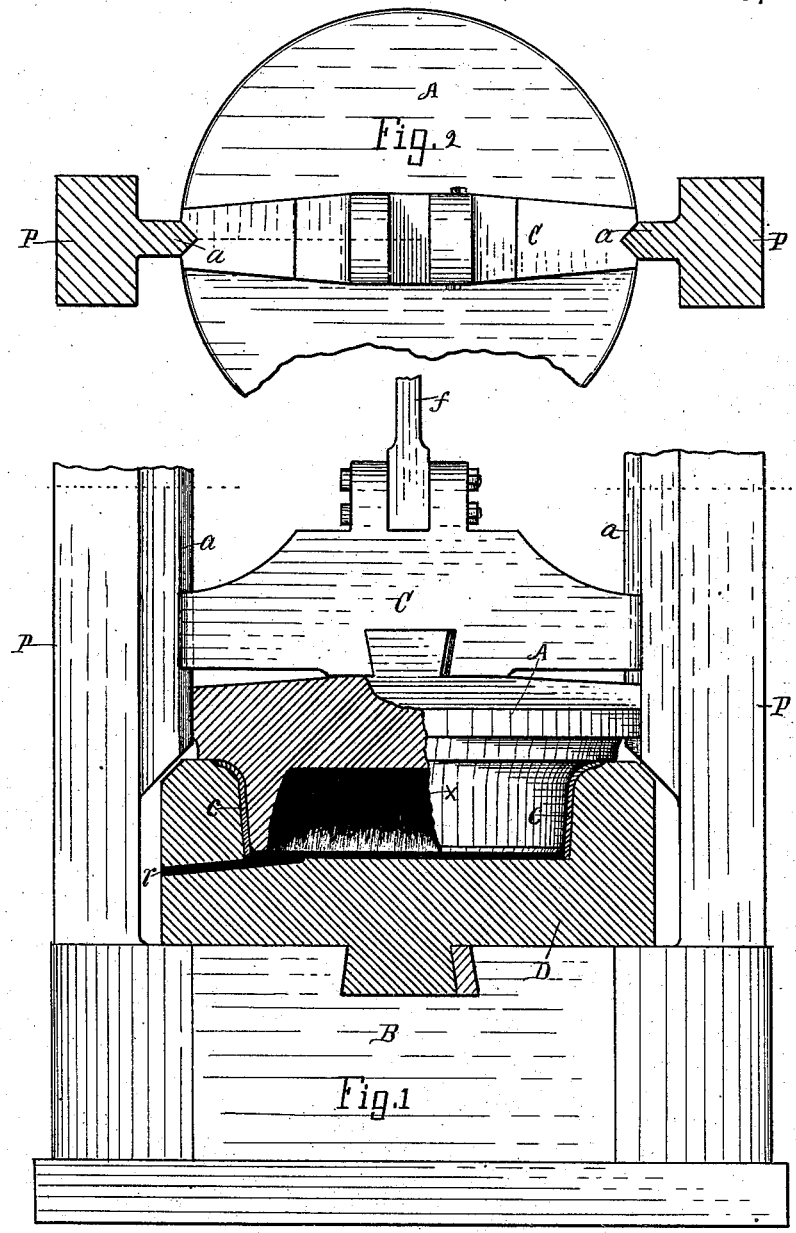
Witnesses.
John C. Perkins
John H. Chase
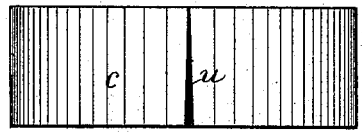
Fig. 3
Inventor.
George W. Miller
By Lucius C. West
Atty.

UNITED STATES PATENT OFFICE.

GEORGE W. MILLER, OF KALAMAZOO, MICHIGAN.

DIE FOR SHAPING CAR-WHEEL RIMS.

SPECIFICATION forming part of Letters Patent No. 373,084, dated November 15, 1887.

Application filed February 28, 1887. Serial No. 229,370. (No model.)

*To all whom it may concern:*

Be it known that I, GEORGE W. MILLER, a citizen of the United States, residing at Kalamazoo, county of Kalamazoo, State of Michigan, have invented a new and useful Process and Machine for Making Wheel-Rims, of which the following is a specification.

This invention consists in the process, and means for carrying the process into effect, of forming car-wheel tires, substantially as below described and claimed.

In the drawings forming a part of this specification, Figure 1 is a side elevation, parts being in vertical section; Fig. 2, a broken plan with parts in section on the dotted lines in Fig. 1; and Fig. 3 is a side elevation of a wheel-rim before completion.

The process consists in bending a strip of metal, of proper thickness, width, length, and quality, into circular form and welding the ends together.

In Fig. 3, $c$ is a band ready to weld. I prefer to cut each end on a bias, as at $u$, so that when welded one edge of the rim, the edge on which the flange of the rim or tire is turned, will be slightly flaring, or greater in diameter than the other edge; but this is not necessary. I then place the welded band into a female die, D, the interior of which corresponds to the configuration of the periphery of the tire when completed, such configuration of the tire of course being well understood as having a tread part and curved flange, as at $c$, Fig. 1. I then employ a male die, A, which has a periphery in shape corresponding to the interior of the tire when completed. This die A terminates the lower end of the drop C; or, if preferred, it may be attached directly to vertically-playing power-shaft $f$. This shaft is here broken, but works on a like principle of shafts carrying other dies and drop-hammers and the like. The female die is entirely in vertical section at the center, and the male die is in vertical section on the dotted line in Fig. 2. This male die comes down into the rim or tire $c$ with great force and flares the tire at the upper edge to make the flange of the wheel, as shown in Fig. 1. If one blow is not sufficient, as many are given as are necessary to perfectly shape the tire.

It will be observed that the male die A is dished out or internally hollow at the base, as at $x$. By this means air is compressed therein to cushion the force of stroke somewhat.

At $r$ is a vent or air-escape leading out from the interior of the female die. Thus the escape of the air so suddenly compressed is concentrated and danger to the operator and of bursting the dies is obviated.

At B is the bed for the lower die.

P are upright standards, and $a$ are ribs thereon forming guides to the upper die and drop, these parts being V-grooved at the sides to receive said ribs, Fig. 2.

Having thus described my invention, what I claim is—

1. The combination, with the male die having a periphery corresponding in shape to the interior of the wheel-rim, of the female die having an internal configuration corresponding to the exterior of the wheel-rim and provided with the air-escape, substantially as set forth.

2. The male die having the internally-hollowed base and periphery, as described, and the female die internally formed as shown and having the air-escape, substantially as set forth.

In testimony of the foregoing I have hereunto subscribed my name in presence of two witnesses.

GEO. W. MILLER.

Witnesses:
H. B. HOYT,
H. B. MILLER.